United States Patent
Maetani

(10) Patent No.: US 8,618,774 B2
(45) Date of Patent: Dec. 31, 2013

(54) CHARGE AND DISCHARGE BATTERY CONTROL CIRCUIT

(75) Inventor: Fumihiko Maetani, Chiba (JP)

(73) Assignee: Seiko Instruments Inc., Chiba (JP)

( * ) Notice: Subject to any disclaimer, the term of this patent is extended or adjusted under 35 U.S.C. 154(b) by 420 days.

(21) Appl. No.: 12/964,088

(22) Filed: Dec. 9, 2010

(65) Prior Publication Data

US 2011/0140670 A1 Jun. 16, 2011

(30) Foreign Application Priority Data

Dec. 11, 2009 (JP) ................................. 2009-282136

(51) Int. Cl.
*H02J 7/00* (2006.01)

(52) U.S. Cl.
USPC ......................................................... 320/134

(58) Field of Classification Search
USPC ......................................................... 320/134
See application file for complete search history.

(56) References Cited

U.S. PATENT DOCUMENTS

| 6,380,763 B1 | 4/2002 | Ando | |
| 2008/0186747 A1* | 8/2008 | Balakrishnan et al. | 363/84 |
| 2008/0310064 A1* | 12/2008 | Uno | 361/86 |

FOREIGN PATENT DOCUMENTS

JP 2000-308266 A 11/2000

* cited by examiner

*Primary Examiner* — Arun Williams
(74) *Attorney, Agent, or Firm* — Brinks Gilson & Lione

(57) ABSTRACT

Provided are a battery state monitoring circuit and a battery device that are capable of reliably controlling charge by a charger even if a voltage of a secondary battery drops to around 0 V. The battery state monitoring circuit includes a minimum operating voltage monitoring circuit for detecting that the voltage of the secondary battery is lower than a minimum operating voltage of the battery state monitoring circuit. When the voltage of the secondary battery is lower than the minimum operating voltage of the battery state monitoring circuit, an output of an overdischarge detection circuit is set to an overdischarge detected state.

4 Claims, 3 Drawing Sheets

CHARGE AND DISCHARGE BATTERY CONTROL CIRCUIT

RELATED APPLICATIONS

This application claims priority under 35 U.S.C. §119 to Japanese Patent Application No. 2009-282136 filed on Dec. 11, 2009, the entire content of which is hereby incorporated by reference.

BACKGROUND OF THE INVENTION

1. Field of the Invention

The present invention relates to a battery state monitoring circuit and a battery device that detect a voltage and an abnormality of a secondary battery, and more particularly, to a battery state monitoring circuit and a battery device that are capable of controlling charge by a charger even if a secondary battery voltage drops to around 0 V.

2. Description of the Related Art

A battery device is provided with a function of permitting/inhibiting the charge to a secondary battery when a charger is connected thereto in a state in which a voltage of the secondary battery extremely drops to around 0 V (see, for example, Japanese Patent Application Laid-open No. 2000-308266). Hereinafter, such a function is referred to as function of permitting/inhibiting 0 V charge.

FIG. 3 illustrates a circuit diagram of a battery device including a conventional battery state monitoring circuit. The battery device including the conventional battery state monitoring circuit includes a secondary battery 1, a charge/discharge control circuit 2 for monitoring a voltage of the secondary battery 1, a switch circuit 3 for controlling the charge and discharge of the secondary battery 1, external terminals 4 and 5 between which a charger 8 or a load 9 is to be connected, and a charge switch drive circuit 7. The charge switch drive circuit 7 includes a level shifter circuit 15, a P-type metal oxide semiconductor (PMOS) transistor 16, an N-type metal oxide semiconductor (NMOS) transistor 17, a resistor 18, an inverter circuit 26, a NOR circuit 25, a PMOS transistor 20, and an NMOS transistor 21. The switch circuit 3 includes a discharge switch 10 and a charge switch 11.

The battery device described above functions to permit the 0 V charge through the following operations.

The level shifter circuit 15 outputs High when its input signal is High, and outputs Low when its input signal is Low. The output of the level shifter circuit 15 is then input to the NOR circuit 25. The PMOS transistor 16, the NMOS transistor 17, and the resistive element 18 together form a battery voltage detection circuit. When the voltage of the secondary battery 1 drops to be lower than a threshold voltage of the PMOS transistor 16, the battery voltage detection circuit outputs Low so that a signal of High is input to the NOR circuit 25 via the inverter circuit 26. The output of the NOR circuit 25 drives the charge switch 11 via an inversion output circuit formed of the PMOS transistor 20 and the NMOS transistor 21.

When the output of the level shifter circuit 15 is Low and the output of the battery voltage detection circuit is High, the output of the inverter circuit 26 is Low, and accordingly both the inputs of the NOR circuit 25 are Low and the output of the NOR circuit 25 is High. Therefore, a gate voltage of the charge switch 11 becomes Low to disable the charge.

In other cases than the above, the output of the NOR circuit 25 is Low, and hence the gate voltage of the charge switch 11 becomes High to permit the charge. Therefore, when the voltage of the secondary battery 1 becomes close to 0 V, the charge switch drive circuit 7 permits the charge. In other words, the battery device functions to permit the 0 V charge.

In the conventional technology, however, the above-mentioned charge/discharge control circuit 2 is driven at the voltage of the secondary battery 1, and hence there is a fear that a discharge control output terminal 12 may output High when the voltage of the secondary battery 1 is low, which poses the following disadvantages.

If the charger 8 is connected when the voltage of the secondary battery 1 is close to 0 V, the NMOS transistor 17 is turned ON, and a voltage of a charge control output terminal 13 becomes High to turn ON the charge switch 11. Then, a charge current flows into the secondary battery 1 from the charger 8. Because the charge/discharge control circuit 2 is driven at the voltage of the secondary battery 1, the output signal thereof remains indefinite until the charge/discharge control circuit 2 is allowed to operate. Accordingly, there is a fear that High may be output from the discharge control output terminal 12. Therefore, if the discharge control output terminal 12 outputs High while the charge switch drive circuit 7 is permitting the charge, the charge switch 11 is turned ON and the discharge switch 10 is also turned ON, with the result that a negative terminal of the secondary battery 1 and the external terminal 5 have substantially the same potential and the NMOS transistor 17 is turned OFF. Once the NMOS transistor 17 is turned OFF, the charge switch drive circuit 7 cancels permission of the charge. Therefore, there arises a problem of oscillation of alternately permitting and inhibiting the charge.

SUMMARY OF THE INVENTION

The present invention has been devised in order to solve the problems described above, and therefore, it is an object of the invention to provide a battery state monitoring circuit and a battery device that are capable of reliably controlling charge by a charger even if a voltage of a secondary battery drops to around 0 V.

In order to solve the conventional problems, a battery device including a battery state monitoring circuit according to the present invention has the following configuration.

A battery state monitoring circuit includes: a reference voltage circuit; an overdischarge detection circuit for comparing a voltage of a secondary battery with a voltage of the reference voltage circuit, to detect overdischarge of the secondary battery; a control circuit for receiving an output of the overdischarge detection circuit; and a minimum operating voltage monitoring circuit for detecting a minimum operating voltage of the battery state monitoring circuit, in which the minimum operating voltage monitoring circuit includes: a first transistor for detecting that the voltage of the secondary battery is lower than the minimum operating voltage of the battery state monitoring circuit; and a second transistor for setting the output of the overdischarge detection circuit to an overdischarge detected state when the voltage of the secondary battery is lower than the minimum operating voltage of the battery state monitoring circuit.

According to the battery device including the battery state monitoring circuit of the present invention, the discharge control output terminal 12 is Low until the voltage of the secondary battery 1 reaches to a minimum operating voltage of the battery state monitoring circuit, to thereby reliably enable the charge switch drive circuit 7 to perform stable charge of the secondary battery 1.

Therefore, the present invention provides an effect of reliably controlling charge by the charger 8 even if the voltage of the secondary battery 1 drops to around 0 V.

DETAILED DESCRIPTION OF THE PREFERRED EMBODIMENTS

Now, referring to the accompanying drawings, embodiments of the present invention are described below.

First Embodiment

Figure 1:
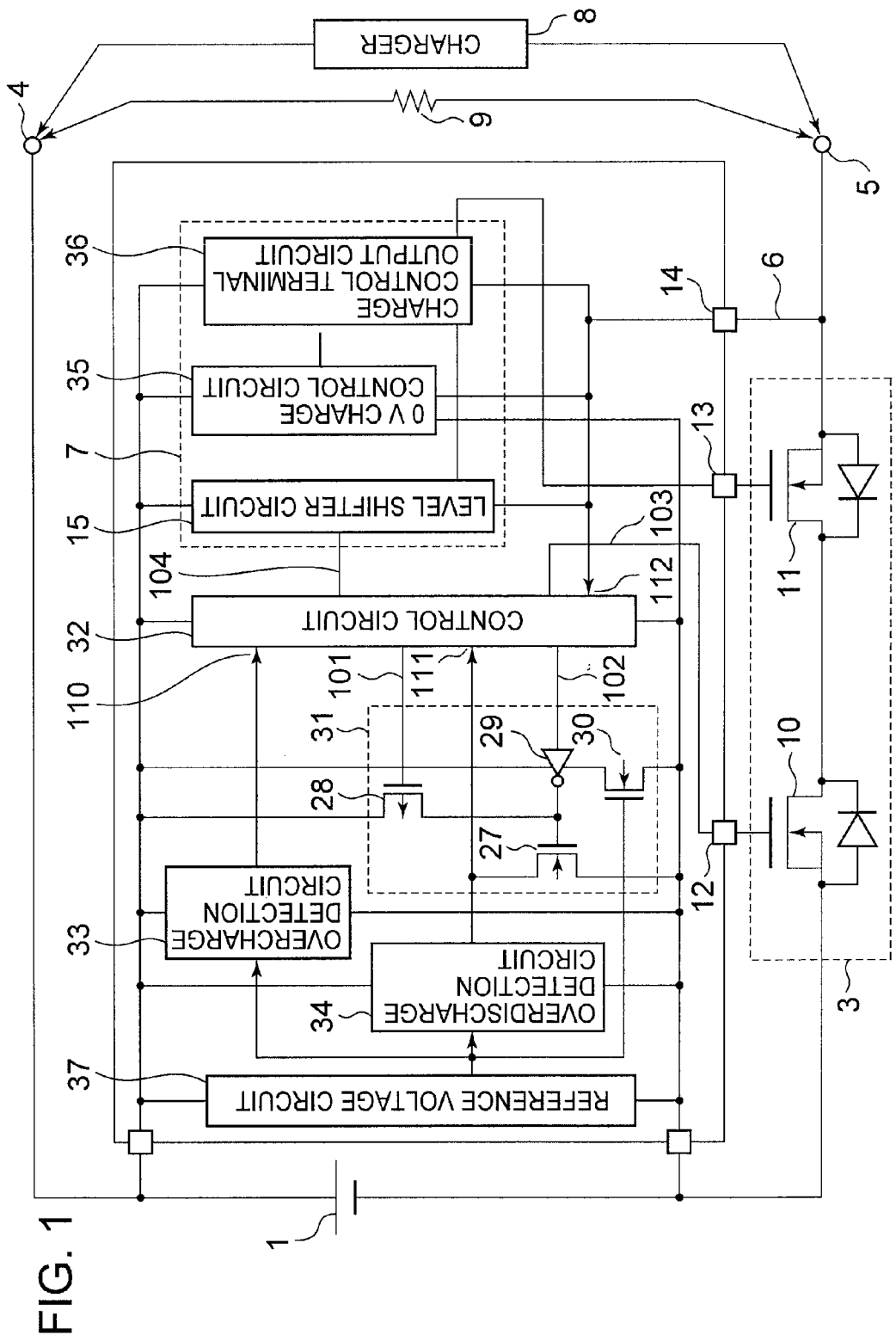
FIG. 1 is a circuit diagram of a battery device including a battery state monitoring circuit according to a first embodiment of the present invention.

FIG. 1 is a circuit diagram of a battery device including a battery state monitoring circuit according to a first embodiment of the present invention.

The battery device according to the first embodiment includes a secondary battery 1, a reference voltage circuit 37, an overcharge detection circuit 33, an overdischarge detection circuit 34, a control circuit 32 for controlling an operation of the battery state monitoring circuit, a switch circuit 3 for controlling charge and discharge of the secondary battery 1, external terminals 4 and 5 between which a charger 8 or a load 9 is to be connected, a charge switch drive circuit 7, and a minimum operating voltage monitoring circuit 31. The charge switch drive circuit 7 includes a level shifter circuit 15, a 0 V charge control circuit 35, and a charge control terminal output circuit 36. The minimum operating voltage monitoring circuit 31 includes an N-type metal oxide semiconductor (NMOS) transistor 27, an NMOS transistor 30, a P-type metal oxide semiconductor (PMOS) transistor 28, and an inverter circuit 29.

Each of the reference voltage circuit 37, the overdischarge detection circuit 34, the overcharge detection circuit 33, and the minimum operating voltage monitoring circuit 31 uses the secondary battery 1 as its power supply. The reference voltage circuit 37 is connected across the secondary battery 1 and has an output connected to an input terminal of the overcharge detection circuit 33, an input terminal of the overdischarge detection circuit 34, and a gate of the NMOS transistor 30 included in the minimum operating voltage monitoring circuit 31. The overcharge detection circuit 33 has an output connected to an input terminal 110 of the control circuit 32. The overdischarge detection circuit 34 has an output connected to an input terminal 111 of the control circuit 32. The control circuit 32 has an input 112 connected to an overcurrent detection terminal 14. The control circuit 32 has an output 101 connected to a gate of the PMOS transistor 28 included in the minimum operating voltage monitoring circuit 31. The control circuit 32 has an output 102 connected to an input of the inverter circuit 29 included in the minimum operating voltage monitoring circuit 31. The control circuit 32 has an output 103 connected to a discharge control output terminal 12. The control circuit 32 has an output 104 connected to the level shifter circuit 15 included in the charge switch drive circuit 7.

The charge switch drive circuit 7 has a positive power supply connected to a positive terminal of the secondary battery 1 and a negative power supply connected to the overcurrent detection terminal 14, with the overcurrent detection terminal 14 used as the ground. The 0 V charge control circuit 35 has an input connected to a negative terminal of the secondary battery 1 and an output connected to the charge control terminal output circuit 36. The charge control terminal output circuit 36 has an output connected to a charge control output terminal 13.

A discharge control switch 10 included in the switch circuit 3 has a gate connected to the discharge control output terminal 12, a drain connected to a drain of a charge control switch 11, and a source connected to the negative terminal of the secondary battery 1. The charge control switch 11 has a gate connected to the charge control output terminal 13 and a source connected to the external terminal 5.

The external terminal 5 is connected to the overcurrent detection terminal 14, and the external terminal 4 is connected to the positive terminal of the secondary battery 1.

The NMOS transistor 27 included in the minimum operating voltage monitoring circuit 31 has a drain connected to the output of the overdischarge detection circuit 34, a source connected to the negative terminal of the secondary battery 1, and a gate connected to an output of the inverter circuit 29 and a drain of the PMOS transistor 28. The PMOS transistor 28 has a source connected to the positive terminal of the secondary battery 1 and the gate connected to the output 101 of the control circuit 32. The inverter circuit 29 has the input connected to the output 102 of the control circuit 32, a positive power supply connected to the positive terminal of the secondary battery 1, and a negative power supply connected to a drain of the NMOS transistor 30. The NMOS transistor 30 has the gate connected to the output of the reference voltage circuit 37 and a source connected to the negative terminal of the secondary battery 1.

Next, an operation of the minimum operating voltage monitoring circuit 31 is described. The minimum operating voltage monitoring circuit 31 detects a minimum operating voltage of the battery state monitoring circuit.

The NMOS transistor 27 is controlled by a signal of the output 102 of the control circuit 32 and, when turned ON, forcibly changes the output of the overdischarge detection circuit 34 to Low as an overdischarge detected state. When a voltage of the secondary battery 1 drops close to 0 V, the output of the reference voltage circuit 37 is around 0 V, and accordingly the NMOS transistor 30 is turned OFF. Then, even when the control circuit 32 outputs a signal of High as the output 102, the inverter circuit 29 can no longer output Low because its negative power supply is interrupted. Although not illustrated, the PMOS transistor 28 has a current mirror configuration together with a transistor included in the control circuit 32, and thereby supplies a constant current all the time. This constant current is large enough to turn ON the NMOS transistor 27, allowing the output of the inverter circuit 29 to be changed to High. Because the output of the inverter circuit 29 is High, the NMOS transistor 27 is turned ON so that the output of the overdischarge detection circuit 34 becomes Low, resulting in the overdischarge detected state.

Because of the overdischarge detected state, the control circuit 32 outputs a signal of Low as the output 103 to turn OFF the discharge control switch 10. Then, when the charger 8 is connected to supply a charge current, the charge current flows through a parasitic diode of the discharge control switch 10. Accordingly, a potential of the external terminal 5 is stabilized at a potential which is reduced from a potential of the negative terminal of the secondary battery 1 by Vf corresponding to the parasitic diode. Then, the charge switch drive circuit 7 outputs a signal for permitting the charge, to thereby perform stable charge of the secondary battery 1. This way, even if the voltage of the secondary battery 1 drops to be lower than the minimum operating voltage of the battery state monitoring circuit, it is possible to set the overdischarge detected state and thereby perform the stable charge.

On this occasion, the minimum operating voltage monitoring circuit 31 monitors the output of the reference voltage circuit 37, which has the highest minimum operating voltage. Therefore, when the voltage of the secondary battery 1 drops, it is possible to reliably detect the minimum operating voltage of the battery state monitoring circuit.

Note that, the battery state monitoring circuit according to the first embodiment employs the above-mentioned configuration because the reference voltage circuit 37 has the highest minimum operating voltage. Accordingly, in a case where another element has a higher minimum operating voltage than that of the reference voltage circuit 37, the minimum operating voltage monitoring circuit 31 may monitor an output of that element instead.

As described above, according to the battery device of the first embodiment, even if the voltage of the secondary battery 1 becomes close to 0 V, it is possible to detect the overdischarge so that the charge switch drive circuit 7 may output a signal for permitting the charge to thereby perform stable charge of the secondary battery 1.

Second Embodiment

Figure 2:
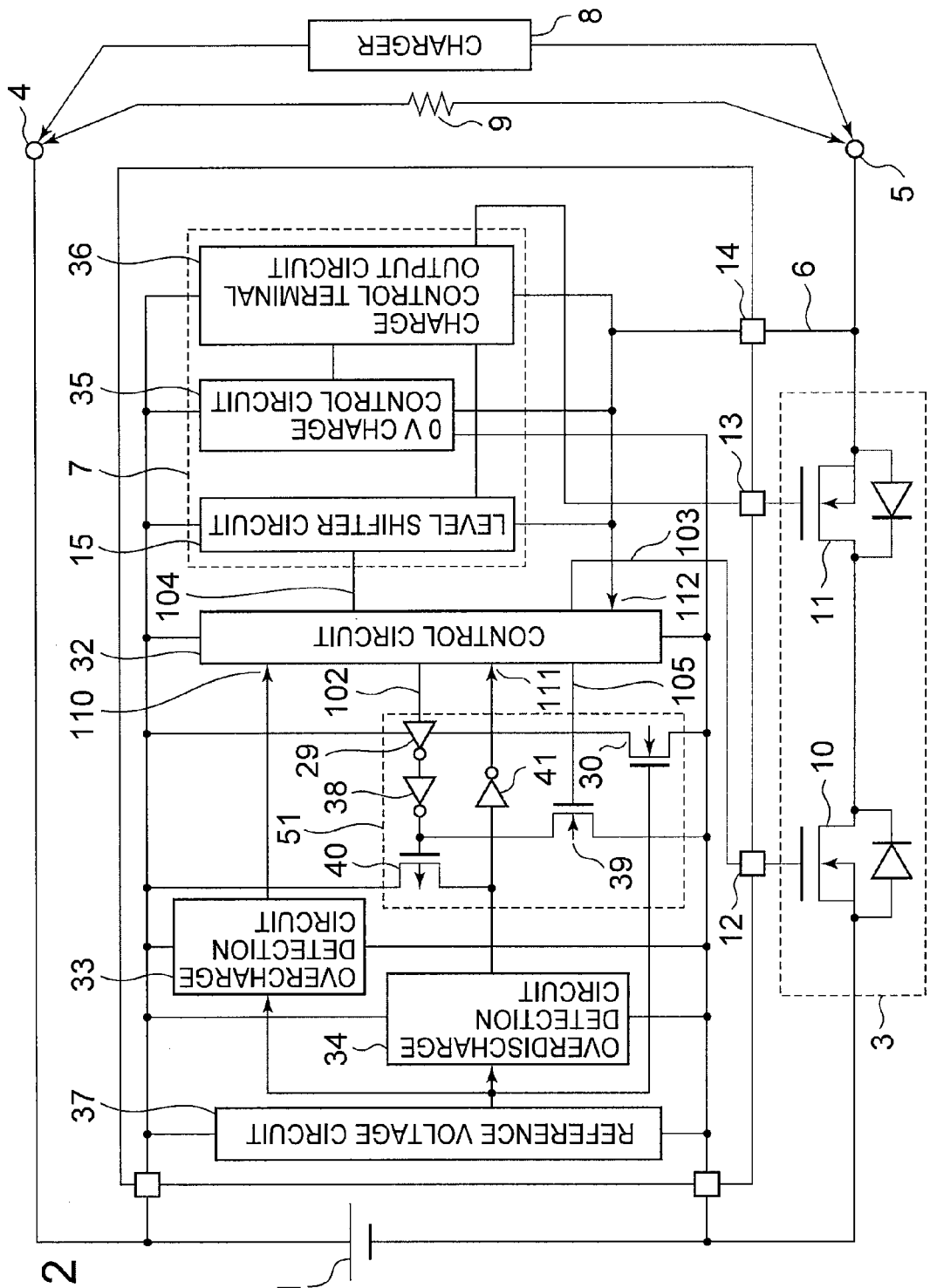
FIG. 2 is a circuit diagram of a battery device including a battery state monitoring circuit according to a second embodiment of the present invention.
Figure 3:
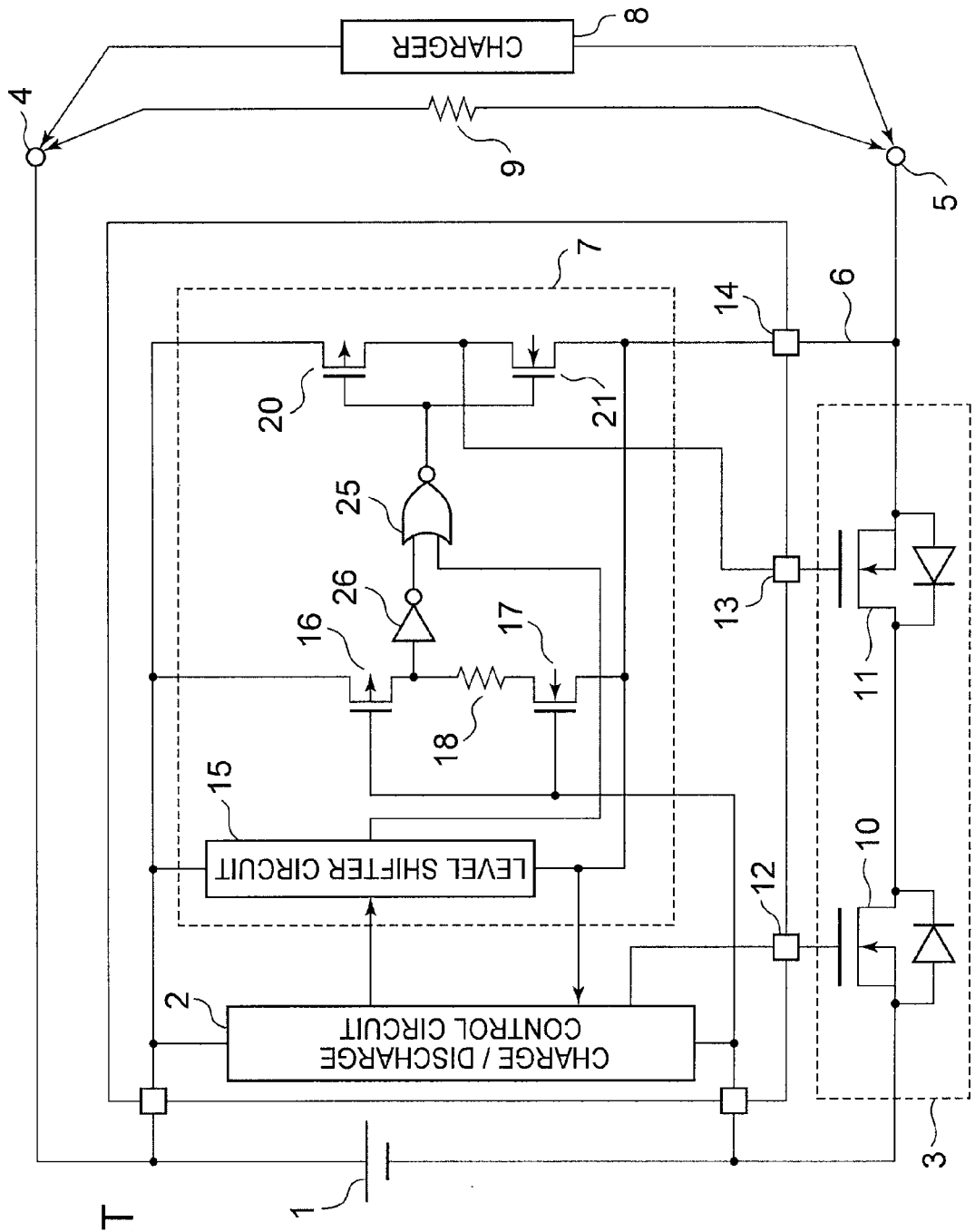
FIG. 3 is a circuit diagram of a battery device including a conventional battery state monitoring circuit.

FIG. 2 is a circuit diagram of a battery device including a battery state monitoring circuit according to a second embodiment of the present invention. FIG. 2 is different from FIG. 1 in that a minimum operating voltage monitoring circuit 51 is adapted to support a case where the overdischarge detection circuit 34 enters the overdischarge detected state with High.

Connection is made as follows. A PMOS transistor 40 of the minimum operating voltage monitoring circuit 51 has a drain connected to the output of the overdischarge detection circuit 34, a source connected to the positive terminal of the secondary battery 1, and a gate connected to an output of an inverter circuit 38 and a drain of an NMOS transistor 39. The NMOS transistor 39 has a source connected to the negative terminal of the secondary battery 1 and a gate connected to an output 105 of the control circuit 32. The inverter circuit 38 has an input connected to the output of the inverter circuit 29. The inverter circuit 29 has the input connected to the output 102 of the control circuit 32, the positive power supply connected to the positive terminal of the secondary battery 1, and the negative power supply connected to the drain of the NMOS transistor 30. An inverter circuit 41 has an input connected to the output of the overdischarge detection circuit 34 and an output connected to the input 111 of the control circuit 32. The NMOS transistor 30 has the gate connected to the output of the reference voltage circuit 37 and the source connected to the negative terminal of the secondary battery 1.

Next, an operation of the minimum operating voltage monitoring circuit 51 according to the second embodiment is described.

The PMOS transistor 40 is controlled by a signal of the output 102 of the control circuit 32 and, when turned ON, forcibly changes the output of the overdischarge detection circuit 34 to High as the overdischarge detected state. When the voltage of the secondary battery 1 drops close to 0 V, the output of the reference voltage circuit 37 is around 0 V, and accordingly the NMOS transistor 30 is turned OFF. Then, the negative power supply of the inverter circuit 29 is interrupted, and hence the inverter circuit 29 can no longer output Low. Although not illustrated, the NMOS transistor 30 has a current mirror configuration together with a transistor included in the control circuit 32, and thereby supplies a constant current all the time. This constant current is large enough to turn ON the PMOS transistor 40, allowing the output of the inverter circuit 38 to be changed to Low. Because the output of the inverter circuit 38 is Low, the PMOS transistor 40 is turned ON so that the output of the overdischarge detection circuit 34 becomes High, resulting in the overdischarge detected state.

On this occasion, the minimum operating voltage monitoring circuit 51 monitors the output of the reference voltage circuit 37, which has the highest minimum operating voltage. Therefore, when the voltage of the secondary battery 1 drops, it is possible to reliably detect the minimum operating voltage of the battery state monitoring circuit.

Note that, the battery state monitoring circuit according to the second embodiment employs the above-mentioned configuration because the reference voltage circuit 37 has the highest minimum operating voltage. Accordingly, in a case where another element has a higher minimum operating voltage than that of the reference voltage circuit 37, the minimum operating voltage monitoring circuit 51 may monitor an output of that element instead.

As described above, according to the battery device of the second embodiment, even if the voltage of the secondary battery 1 becomes close to 0 V, it is possible to detect the overdischarge so that the charge switch drive circuit 7 may output a signal for permitting the charge to thereby perform stable charge of the secondary battery 1.

What is claimed is:

1. A battery state monitoring circuit for controlling charge/discharge of a secondary battery, comprising:
    a reference voltage circuit;
    an overdischarge detection circuit for comparing a voltage of the secondary battery with a voltage of the reference voltage circuit, to detect overdischarge of the secondary battery;
    a control circuit for receiving an output of the overdischarge detection circuit; and
    a minimum operating voltage monitoring circuit for detecting a minimum operating voltage of the battery state monitoring circuit,
    wherein the minimum operating voltage monitoring circuit comprises:
    a first transistor for detecting that the voltage of the secondary battery is lower than the minimum operating voltage of the battery state monitoring circuit; and
    a second transistor for setting the output of the overdischarge detection circuit to an overdischarge detected state when the voltage of the secondary battery is lower than the minimum operating voltage of the battery state monitoring circuit, wherein the second transistor comprises a gate in communication with the control circuit, a drain coupled to an output of the overdischarge detection circuit, and a source coupled to one of a negative terminal of the secondary battery or a positive terminal of the secondary battery.

2. A battery state monitoring circuit according to claim 1, wherein the minimum operating voltage monitoring circuit further comprises a third transistor for one of pulling up and pulling down a gate of the second transistor.

3. A battery state monitoring circuit according to claim 1, wherein the first transistor includes a gate connected to an output of the reference voltage circuit.

4. A battery device, comprising:
a chargeable/dischargeable secondary battery;
a charge/discharge control switch provided in a charge/discharge path of the chargeable/dischargeable secondary battery; and
the battery state monitoring circuit according to claim 1, for monitoring a voltage of the chargeable/dischargeable secondary battery, to open/close the charge/discharge control switch, to thereby control charge/discharge of the chargeable/dischargeable secondary battery.

* * * * *